United States Patent

[11] 3,534,647

[72] Inventor Albert D. Mills
  Plymouth, Minnesota
[21] Appl. No. 734,625
[22] Filed June 5, 1968
[45] Patented Oct. 20, 1970
[73] Assignee Continental Machines, Inc.
  Savage, Minnesota
  a corporation of Minnesota

[54] APPARATUS FOR MINIMIZING VIBRATION IN BAND SAWING MACHINES
  11 Claims, 9 Drawing Figs.
[52] U.S. Cl. .................................................. 83/201.15,
  143/160
[51] Int. Cl. .................................................. B26d 1/54

[50] Field of Search .................................. 83/201–201.15;
  143/160

[56] References Cited
  UNITED STATES PATENTS
  3,077,132  2/1963  Whitmore .................... 83/201.07
  3,104,575  9/1963  Robinson .................... 83/201.15X
  FOREIGN PATENTS
  859,864  1/1962  France ........................ 83/201.15

Primary Examiner—William S. Lawson
Attorney—Ira Milton Jones

ABSTRACT: A band sawing machine having resiliently mounted blade backups to minimize machine vibration.

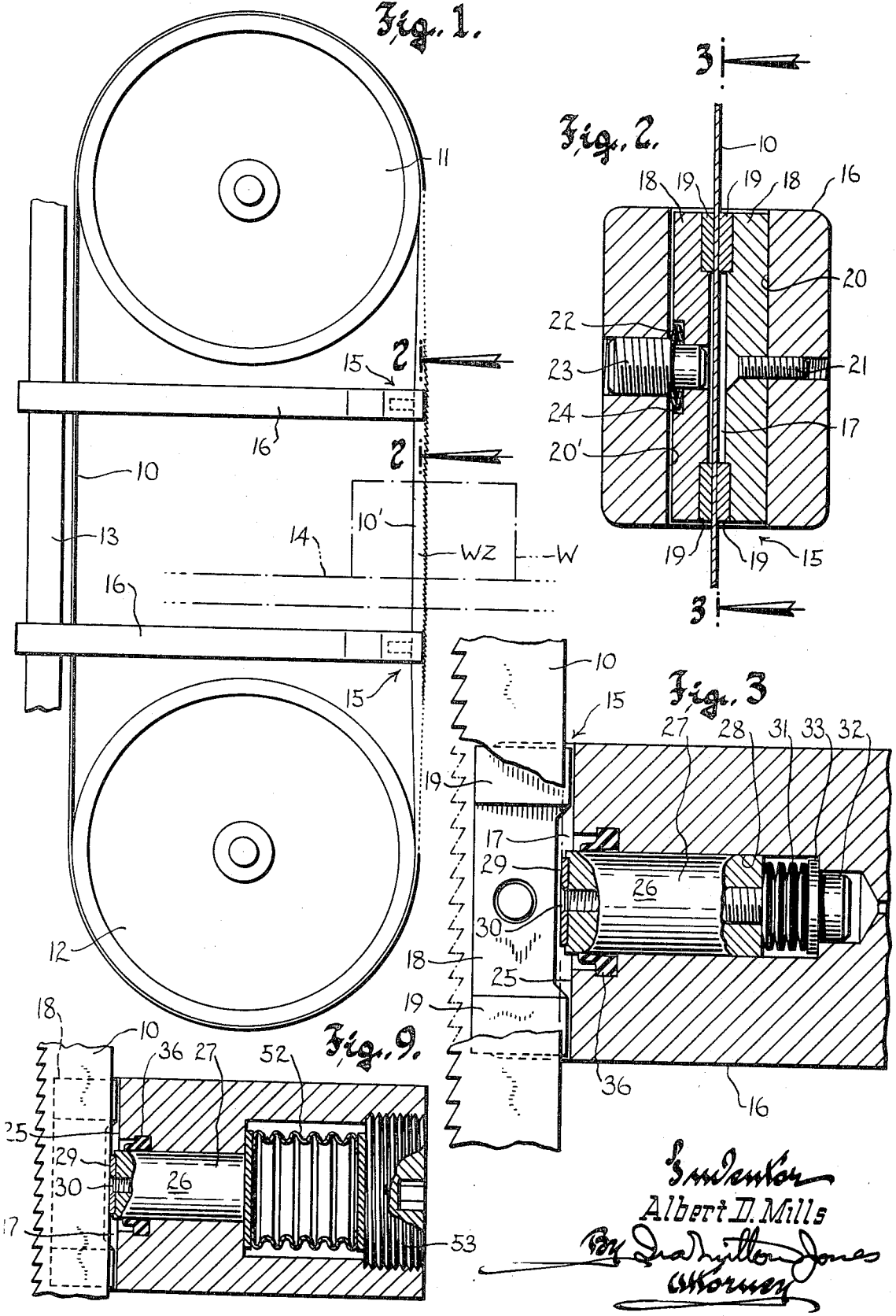

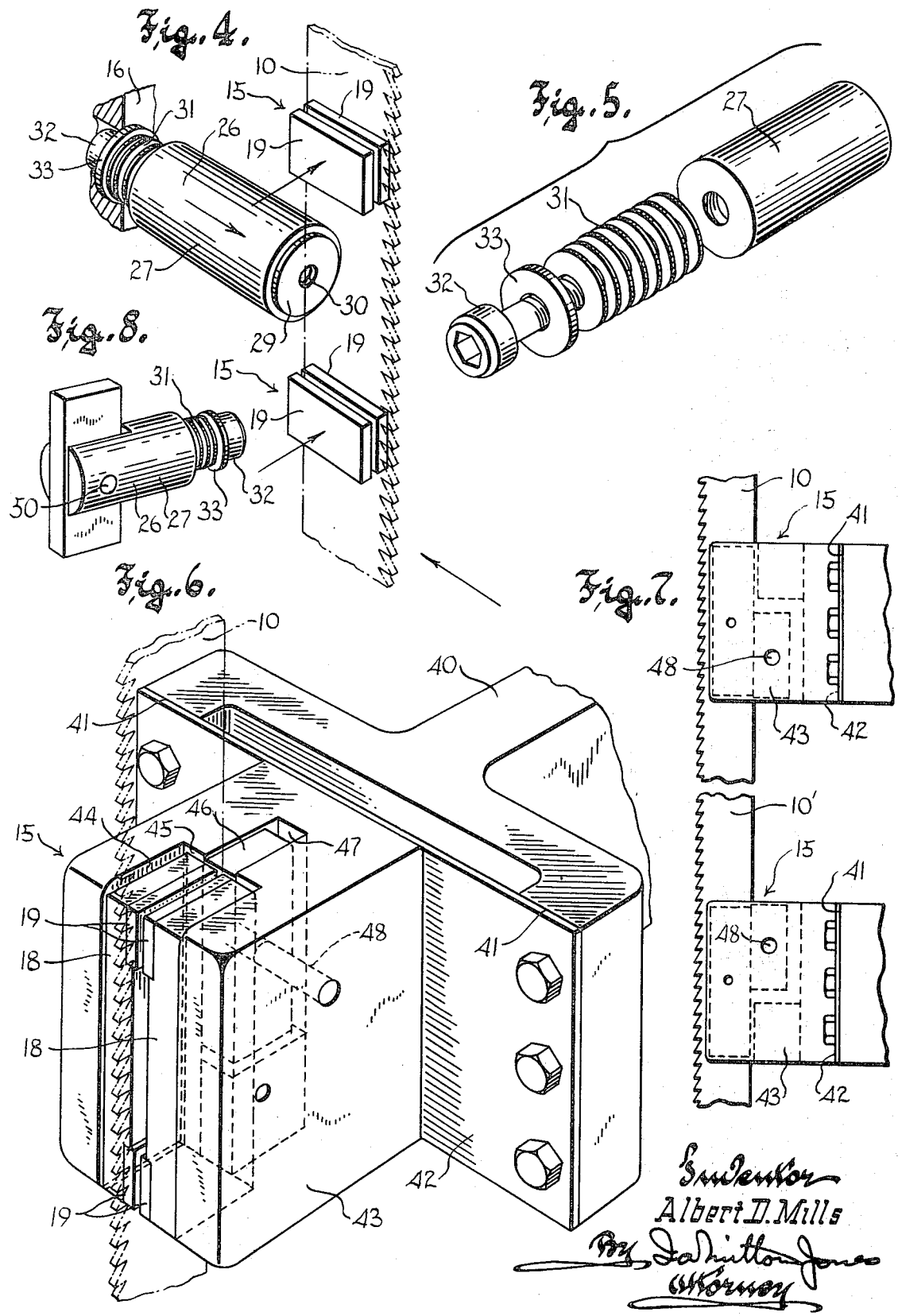

APPARATUS FOR MINIMIZING VIBRATION IN BAND SAWING MACHINES

This invention relates to band saws and refers more particularly to metal cutting band saws.

SUMMARY

The invention can be summarized as residing in the concept of minimizing vibration in a band sawing machine having an endless saw band, power driven to travel at high linear speed in a defined orbit with a stretch thereof passing through a work zone for cutting engagement with work therein, under a feed force of predetermined magnitude, by so resiliently supporting the saw band at the locations where it enters and leaves the work zone, against the thrust of the work thereon during cutting as to provide for edgewise displacement of the saw band in the direction parallel to the applied thrust whenever irregularities in the cutting edge of the band and/or other transient conditions subject the band to loads and feed forces different from those which obtain when the feed force is at its predetermined magnitude.

One of the most difficult tasks confronting designers and builders of metal cutting band sawing machines has been to keep vibration in the machine at a low inconsequential level. Vibration due to dynamic imbalance can be corrected without too much difficulty, but the real problem is vibration that results from unpredictable variations in load on the band driving system — usually called "band loading" — and fluctuations in feed force, i.e. the force under which cutting engagement between the saw band and the work is maintained, both of which variations result primarily from irregularities in the band and especially its toothed edge. If every tooth on the band performed exactly the same amount of work as all the other teeth, any vibration chargeable to the cutting action would be so slight that its effects could be ignored. But, in practice, saw bands just do not perform with this utopian uniformity.

For reasons which have never been understood, one tooth will dig deeper into the work than its predecessors or followers. Regardless of why this happens, when it does, it increases the band loading and the feed force, and in so doing introduces a transient stress in the structure of the machine with the result that the machine begins to vibrate.

Some of the known sources of vibration producing variations in the load on the band driving instrumentalities and fluctuations in feed force are high teeth, low teeth, dog leg (i.e. deviations from straightness in the band) chip welding and chip interference. There are perhaps other transient conditions which contribute to and complicate the vibration problem in metal cutting band saws. But whatever the causes might be, heretofore the only known way to combat the problem was to "beef up" the machine, as by adding strength and mass to the band driving system and all of the structure involved in supporting the backup bearings or shoes on which the smooth back edge of the band rides. Obviously, this approach increases the cost of the machine.

The desire to build quality performance into a lighter, less expensive machine led to the discovery upon which the present invention is based, which — as indicated in the preceding summary of the invention — is that the inevitable transient variations in band loading and feed force can be accommodated and kept from introducing vibration producing stresses in the machine if the backups are resiliently supported against the thrust of the work.

Tests have demonstrated that a machine which — when equipped with conventionally supported backups — vibrated so badly during cutting that it was feared the machine would "tear itself apart", but which — when provided with backup supports in accordance with this invention — cut smoothly and performed exceptionally well.

The purpose and object of this invention, therefore, is to provide metal cutting band sawing machines with means for minimizing vibrations resulting from irregularities in the saw band and/or other conditions which impose transient variations in band loading and feed force.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate several complete examples of the physical embodiment of the invention constructed according to the best modes so far devised for the practical application of the principles thereof, and in which:

FIG. 1 diagrammatically illustrates a metal cutting band saw of the type more fully disclosed in the copending application, Ser. No. 686,223, filed Nov. 28, 1967 and owned by the assignee of the instant application;

FIG. 2 is a sectional view through FIG. 1 on the plane of the line 2—2, and drawn to a larger scale;

FIG. 3 is a sectional view through FIG. 2 on the plane of the line 3—3;

FIG. 4 is a fragmentary perspective view illustrating the essential elements of one of the band backup and guide assemblies of the machine;

FIG. 5 is an exploded perspective view of one of the backups;

FIG. 6 is a perspective view illustrating a modified embodiment of the invention, which differs from that of FIGS. 1—5 in that the side guides for the band, as well as the backup, are resiliently mounted;

FIG. 7 is a side view of the structure shown in FIG. 6, but at a smaller scale;

FIG. 8 is a perspective view of a modified form backup; and

FIG. 9 is a sectional view similar to FIG. 3 illustrating the use of an "air spring" to provide the desired resilient support for the backups.

Referring to the accompanying drawings, the numeral 10 designates the endless saw band of a metal cutting band sawing machine. As is customary, the band is trained about a pair of pulleys 11 and 12, which in the present case are spaced apart vertically, and suitably supported for rotation from the frame of the machine, represented in FIG. 1 by the upright pedestal 13. One of the pulleys is power driven by any conventional driving system (not shown) to impart high speed linear travel to the saw band around an orbit defined by the pulleys, with the cutting stretch 10' of the band travelling downwardly through a work zone WZ, for cutting engagement with the work to be cut.

In FIG. 1, the workpiece W rests upon a table 14 and the cutting stretch of the saw band is twisted 90° so that the direction of the feed force under which the work and saw band engage is perpendicular to the axes of the pulleys. Cutting engagement between the saw band and the work may be produced either by bodily moving the entire frame structure which carries the pulleys and of course the saw band trained thereabout as well as the drive instrumentalities by which the band is driven, with respect to the work supporting table 14, or vice versa. In either case, suitable power means (not shown) effects the needed relative motion between the workpiece and the saw band, and also provides the feed force needed to cause the saw band to cut the work.

At its entrance into and its exit from the work zone, the cutting stretch 10' of the band is supported and guided by backup and side guide assemblies, designated generally by the numeral 15. Preferably these assemblies are identical in design and construction, though such identity is not essential. In any event, both of these assemblies are mounted on the outer ends of arms 16 which extend horizontally from the pedestal 13 and constitute rigid supporting members. At the outer end of these arms a vertical slot 17 accommodates a pair of side guides 18, similar to those of U.S. Pat. No. 3,104,575. These side guides are steel bars with carbide inserts 19 upon which the side faces of the saw band ride. One of the guides is fixed to the adjacent side wall 20 of the slot 17 as by a screw 21, the other is spring loaded — that is, it is resiliently urged toward its mate by spring washers 22 which react between the guide and the other side wall 20' of the slot.

To enable adjustment of the frictional force with which the side guides grip the saw band therebetween, the spring washers are placed on the reduced diameter end of an adjusting screw 23 threaded in the wall 20' to be interposed between the shoulder at the base of the reduced end of the screw and the bottom of a pocket 24 in the side guide.

It should be observed that the spring-loaded side guides frictionally resist transverse edgewise displacement of the saw band therebetween, as well as lengthwise passage of the band.

Protruding from the bottom wall 25 of the slot 17 is the backup 26 of each of the two assemblies. In that embodiment of the invention shown in FIGS. 1—5, the backup 26 is a cylindrical plug or plunger 27 slideably received in a well provided by a bore 28 in the outer end of the supporting arm and opening to the bottom wall 25 of its slot 17. The outer end of the plug or plunger has a hard wear-resistant facing upon which the smooth back edge of the band rides. This facing is preferably provided by a carbide disc 29 suitable adhered to the plug or plunger, and provided with a central chamfered hole 30 for a purpose to be explained.

At its inner end the plug or plunger has a stack of spring washers 31 of the Bellvielle type, attached thereto. As best shown in FIG. 5, the stack of spring washers is mounted on a screw 32 threaded into a tapped hole in the plug or plunger to be confined between the end of the plug or plunger and a plain washer 33 against which the head of the screw bears. Obviously, if desired, the screw can be used to preload on the spring washers, but ordinarily it is preferable to merely take up the slack between the washers. The stack of spring washers thus provides a resilient thrust receiving means between the rigid support 16 and the plug or plunger and resiliently carries the reaction to the feed force which is manifested between the work and the saw band during cutting.

Preferably the bore 28 is counterbored and has a rubber grommet or collar 36 seated therein to guard against the entry of dirt into the bore. When necessary, the plug or plunger can be withdrawn from the bore by inserting a screw into a tapped hole in the front end of the plug or plunger.

During operation of the machine, the back edge of the saw band will in time wear a groove in the facing 29, despite its hardness. When that happens it is desirable to rotate the plug or plunger and thereby present a new bearing surface to the saw band. It is in this connection that the chamfered hole 30 has a significant function in addition to affording access to the tapped "withdrawal" hole.

In the absence of any hole in the backup facing, the intersection of the new path of the band across the facing and the groove that had been worn into the facing by the previous path, would present objectionable sharp edges to the saw band. The chamfered hole 30 eliminates that possibility.

Upon cutting engagement between the work and the saw band under a selected feed force, the resilient thrust receiving means afforded by the spring washers of both the upper and lower backup and guide assemblies will yield and permit the cutting stretch of the band to assume a location with respect to the rigid supporting members 16 determined by the magnitude of the selected feed force which selection depends upon the hardness and nature of the work to be cut. In any event, the selected feed force has a predetermined magnitude which would remain constant if the saw band was perfectly free from irregularities and transient variations in band loading were never encountered.

But in practice such perfection is out of the question. On the contrary, variations in band loading and fluctuations in feed force are inevitable. With each deviation from the predetermined feed force — either positive or negative — caused by irregularities in the saw band and other transient conditions, the resilient supports for the backups yield or expand and permit the band to move edgewise parallel to the applied thrust an amount and in the direction needed to maintain the feed force at its predetermined magnitude. This compensation for the transient variations in band loading keeps them from setting up recurrent and changing stresses in the frame structure of the machine, which if permitted to exist would produce serious vibration problems.

Another advantage of the structure illustrated in FIGS. 1—5 stems from the fact that its spring loaded side guides frictionally resist edgewise displacement of the band. This frictional restraint — occuring each time the saw band moves in or out with the fluctuating feed force — provides a damping force which serves quite effectively to prevent continuous harmonic vibration being set up in the backups.

MODIFIED EMBODIMENT OF FIGS. 6—7

While the preferred embodiment of the invention is that of FIGS. 1—5, to a considerable extent the advantages of the invention are also attainable with the structure illustrated in FIGS. 6 and 7. In this case, the entire saw guide assembly — the side guides as well as the backup — is resiliently supported. Here the outer end of each rigid supporting arm 40 has widely spaced forwardly projecting pads 41 to which a spring blade 42 is attached. At its center, the blade 42 mounts a bifurcated block 43. Between the side walls 44 of the slot 45 that gives the block its bifurcated shape, are the spring loaded side guides of the other embodiment of the invention, except that they do not frictionally restrain edgewise displacement of the saw band since they move with the block 43.

The backup in this case is a bar or oblong shoe 46 of carbide or other good wear-resistant material, seated in a recess 47 in the bottom of the slot 45 and pivotally connected to the block 43 by a cross pin 48.

Because of the pivotal connections between the backup shoes 46 and the blocks 43, the shoes are free to maintain contact for their full lengths with the back edge of the band, despite any deviation of the band from true straight line travel as the span between the backup shoes bows under feed force. This freedom to rock guards against having the edges of the shoes dig into the back edge of the band, and distributes wear evenly along the entire length of the shoes and the band.

More important, though, from the standpoint of this invention, the backup shoes are resiliently supported against the thrust of the work by virtue of the blocks 43 being mounted on the spring blades 42.

If desired, the backups 26 of the first described embodiment of the invention may be provided with pivoted shoes 50, as shown in FIG. 8, to gain the advantage of having the surface of the backup across which the band slides at all times uniformly engaged with the back edge of the band.

Also, it should be understood that the stack of spring washers 31 can be replaced by an "air spring" as shown in FIG. 9. The "air spring" can be of any suitable design, but for purposes of illustration has been shown as consisting of a bellows 52 containing compressed air and confined between a fixed, though removable spring seat 53 and the rear end of the backup.

From the foregoing description taken with the accompanying drawing, it should be apparent to those skilled in this art that in preventing or at least greatly minimizing vibration in metal cutting band sawing machines, the present invention makes a valuable contribution to the art.

I claim:

1. A band type cutting machine having an endless cutting band with a cutting edge and a smooth back edge, constrained to travel in a defined orbit with a stretch thereof passing through a work zone in which work to be cut is received, means to drive the cutting band at high linear speed, and means to effect cutting engagement between the cutting edge of the band and the work in the work zone under a feed force of predetermined magnitude, said machine being characterized by means for minimizing vibration therein, comprising:

A. a pair of backup shoes engaging the smooth back edge of the cutting band, one of said backup shoes being located at the entrance of the band into the work zone and the other being located at the exit of the band from the work zone, each of said backup shoes having a hard flat face on which the smooth back edge of the cutting band rides;

B. a rigid support for each backup shoe;

C. means movably mounting each backup shoe on its respective rigid support for free movement edgewise of the band between spaced apart fore and aft positions; and D. spring means interposed between each backup shoe and its rigid support, said spring means having a strength sufficient to carry the thrust imposed thereon by the feed force and resiliently support the backup shoe against said thrust at a location between its fore and aft positions when the feed force is at its predetermined magnitude, so that upon the occurrence of variations in said thrust resulting from irregularities in the saw band and/or other transient conditions which subject the band to loads and feed forces different from those which obtain when the feed force is at its predetermined magnitude, the backup shoe moves fore or aft and thereby prevents the creation of vibration producing stresses in the machine.

2. The structure of claim 1, wherein the movable mounting for each backup shoe comprises means defining a guideway on the rigid support perpendicular to the smooth back edge of the cutting band, and along which the backup shoe slides.

3. The structure of claim 2, further characterized in that the guideway is a bore in the rigid support, the backup shoe is a plug slideable in the bore, and wherein the spring means is a group of spring washers between the inner end of the plug and the bottom of the bore.

4. The structure of claim 1, wherein each rigid support has a slot with bottom and side walls embracing the band, and a well opening to the bottom of the slot, wherein the backup shoe comprises a plug slideably received in said well with the outer end of the plug providing the hard face of the shoe and bearing against the smooth back edge of the cutting band, and wherein the spring means comprises a stack of spring washers confined between the inner end of the plug and the bottom of the well.

5. The structure of claim 4, further characterized by a pair of side guides for the band confined between the side walls of each slot, one of the side guides of each pair being spring loaded so that the side guides frictionally grip the band.

6. The structure of claim 1, wherein each backup shoe has an elongated flat surface providing its hard face along which the smooth back edge of the cutting band rides, and a rockable mounting for the shoe through which the thrust of the feed force during cutting is applied to the spring means, the rockable mounting for the shoe allowing the shoe to rock about an axis perpendicular to the side faces of the cutting band and thereby adjust itself to any deviation of the smooth back edge of the band from true straight line motion.

7. The structure of claim 1, wherein the spring means comprises a leaf spring interposed between the rigid support and the backup shoe.

8. The structure of claim 1, wherein the spring means comprises an elastic envelope containing a gas under pressure, received in a chamber in the rigid support and reacting between the rigid support and the backup shoe.

9. A band type cutting machine having an endless cutting band with a cutting edge and a smooth back edge, constrained to travel in a defined orbit with a stretch thereof passing through a work zone in which work to be cut is received, means to drive the cutting band at high linear speed, and means to effect cutting engagement between the cutting edge of the band and the work in the work zone under a feed force of predetermined magnitude, said machine being characterized by means for minimizing vibration therein, comprising:

A. a pair of backup members engaging the smooth back edge of the cutting band, one of said backup members being located at the entrance of the band into the work zone and the other being located at the exit of the band from the work zone;

B. a rigid support for each backup member;

C. a leaf spring mounted on each rigid support with a portion thereof resiliently movable transversely edgewise of the saw band; and D. means mounting the backup members on the resiliently movable portions of said leaf springs.

10. The band type cutting machine of claim 9, wherein the means mounting each backup member on its respective leaf spring comprises a bifurcated block secured to the resiliently movable portion of the leaf spring and having spaced side walls embracing the saw band, and further characterized by side guides mounted on said side walls and engaging the opposite faces of the saw band.

11. The band type cutting machine of claim 9, wherein each backup member comprises an elongated shoe of hard wear-resistant material;

and wherein the means mounting each backup shoe on its respective leaf spring comprises a solid block secured to the resiliently movable portion of the leaf spring, and a pivot connecting the backup shoe medially of its ends to said block with the axis of the pivot perpendicular to the side faces of the saw band.